(12) United States Patent
Arai (10) Patent No.: US 8,189,297 B2
(45) Date of Patent: May 29, 2012

(54) DISK DRIVE FLEXURE HAVING A METAL BASE WITH A BAND-LIKE PORTION OVERLAPPING A GAP BETWEEN CONDUCTORS FOR DATA WRITING

(75) Inventor: Hajime Arai, Yokohama (JP)

(73) Assignee: NHK Spring Co., Ltd, Yokohama-Shi (JP)

( * ) Notice: Subject to any disclaimer, the term of this patent is extended or adjusted under 35 U.S.C. 154(b) by 167 days.

(21) Appl. No.: 12/706,055

(22) Filed: Feb. 16, 2010

(65) Prior Publication Data

US 2010/0226047 A1 Sep. 9, 2010

(30) Foreign Application Priority Data

Mar. 6, 2009 (JP) ................................. 2009-053564

(51) Int. Cl.
*G11B 21/16* (2006.01)
*G11B 5/48* (2006.01)
(52) U.S. Cl. .................... 360/246; 360/244.3; 360/245.9
(58) Field of Classification Search ............... 360/245.8, 360/245.9, 246, 244.3
See application file for complete search history.

(56) References Cited

U.S. PATENT DOCUMENTS

| 6,714,385 | B1 | 3/2004 | Even et al. | |
|---|---|---|---|---|
| 7,408,744 | B1* | 8/2008 | Cuevas | 360/244.8 |
| 2006/0158785 | A1* | 7/2006 | Arya et al. | 360/246 |
| 2007/0230059 | A1* | 10/2007 | Ota et al. | 360/245.9 |

FOREIGN PATENT DOCUMENTS

JP 9-282624 A 10/1997

* cited by examiner

*Primary Examiner* — Craig A. Renner
(74) *Attorney, Agent, or Firm* — Holtz, Holtz, Goodman & Chick, PC (57) ABSTRACT

A flexure comprises a metal base, an insulating layer, and first and second conductors. First and second openings are formed so as to extend longitudinally relative to the metal base. These openings are formed at predetermined intervals longitudinally relative to the metal base. The metal base comprises ground regions continuous in a longitudinal direction thereof, ladder portions extending transversely relative to the metal base, and band-like portions formed between the openings. The band-like portions are located so as to overlap a gap between the conductors when the metal base is viewed vertically thicknesswise from above. The band-like portions extend longitudinally relative to the metal base along the conductors. Junctions are formed between the ground regions and band-like portions.

2 Claims, 8 Drawing Sheets

[ Comparative example 1 ]

FIG. 8

[ Comparative example 2 ]

DISK DRIVE FLEXURE HAVING A METAL BASE WITH A BAND-LIKE PORTION OVERLAPPING A GAP BETWEEN CONDUCTORS FOR DATA WRITING

CROSS-REFERENCE TO RELATED APPLICATIONS

This application is based upon and claims the benefit of priority from prior Japanese Patent Application No. 2009-053564, filed Mar. 6, 2009, the entire contents of which are incorporated herein by reference.

BACKGROUND OF THE INVENTION

1. Field of the Invention

The present invention relates to a disk drive flexure used in a disk drive for an information processing apparatus, such as a personal computer.

2. Description of the Related Art

A hard disk drive (HDD) is used in an information processing apparatus, such as a personal computer. The hard disk drive comprises a magnetic disk that rotates around a spindle, a carriage that turns around a pivot, etc. A disk drive suspension is disposed on an arm of the carriage.

A disk drive suspension is disclosed in Jpn. Pat. Appln. KOKAI Publication No. 9-282624 (Patent Document 1) or U.S. Pat. No. 6,714,385 (Patent Document 2). The disk drive suspension comprises a load beam, a flexure lapped on the load beam, etc. A slider is mounted on a gimbal portion formed near the distal end of the flexure. The slider is provided with elements (transducers) for access, such as data read or write. The suspension, flexure, etc., constitute a head gimbal assembly.

The flexure may be of any of various practical types corresponding to required specifications, and a flexure with conductors is one known example thereof. The flexure with conductors comprises a metal base, an insulating layer formed on the metal base, and a plurality of conductors formed on the insulating layer. The metal base is formed of a thin stainless-steel plate. The insulating layer is formed of an electrically insulating material, such as polyimide. The conductors are formed of copper. Respective single ends of the conductors are electrically connected to elements (e.g., magnetoresistive (MR) elements) of the slider. The other ends of the conductors are electrically connected to an electronic circuit, such as an amplifier.

In the flexure disclosed in Patent Document 1, a plurality of openings are formed in the metal base at predetermined intervals along the conductors. These openings serve to reduce an eddy-current loss of conductive circuit portion. Thus, the flexure, compared with a flexure without openings, can transfer data at higher speed. However, the flexure of Patent Document 1 has a problem that its crosstalk characteristics are degraded by a magnetic field that is formed around the conductors as current flows through each conductor. Crosstalk causes degradation of MR elements of a head portion or the like as well as production of noise. With the increase of the recording density of modern disks, in particular, the head portion tends to become fragile when exposed to crosstalk. Thus, crosstalk should be minimized.

The earlier the rise time of pulses used in data transfer, the more their harmonic components are, so that data can be transferred at higher speed. The higher the frequencies in the bandwidth, however, the higher the eddy-current loss is. In order to realize a high-frequency band, therefore, large openings should be formed such that the eddy-current loss of the conductive circuit portion can be reduced. On the other hand, openings should not be formed in order to improve the crosstalk characteristics. These problems can be solved to a certain degree by combining openings and insular portions, as in the case of Patent Document 2.

The load beam of the suspension disclosed in Patent Document 2 is provided with a plurality of openings that are formed at predetermined intervals along the conductors. The insular portions independent of the load beam are formed individually within the openings. The suspension with these insular portions has desirable electrical properties to overcome crosstalk. In addition, the capacitance of this suspension is higher than that of a suspension without insular portions. Thus, the suspension of Patent Document 2 has an advantage that the impedance of the conductive circuit portion and the energy consumption of the amplifier are low.

Since the insular portions of Patent Document 2 are not grounded, however, they may be charged with static electricity. As the static electricity is discharged, therefore, it may destroy the MR elements of the head portion or adversely affect signals that are transmitted through the conductors. Further, the insular portions are easily separable from the insulating layer, and the separated insular portions may move in a disk drive and contaminate it. Furthermore, high accuracy is required in locating a large number of insular portions independent of the load beam in predetermined positions relative to the individual openings, so that the yield is poor.

BRIEF SUMMARY OF THE INVENTION

Accordingly, the object of the present invention is to provide a disk drive flexure with high peel strength, in which a conductive circuit portion suffers little eddy-current loss to suit high-speed data transmission and which involves no problems of electrostatic charge and discharge.

The present invention is a flexure which comprises a gimbal portion disposed on a load beam of a disk drive suspension and configured to be mounted with a slider. The flexure comprises a plate-like metal base formed of an electrically conductive material, an insulating layer formed of an electrically insulating material and formed on the metal base, and first and second conductors formed in contact with the insulating layer and extending longitudinally relative to the metal base. The metal base comprises a pair of ground regions continuous in a longitudinal direction of the metal base along opposite side edges of the metal base, a plurality of first openings formed at predetermined intervals longitudinally relative to the metal base en as to be located corresponding to the first conductor, a plurality of second openings formed parallel to the first openings and at the predetermined intervals so as to be located corresponding to the second conductor, a ladder portion extending transversely relative to the metal base between the ground regions of the metal base, a band-like portion formed between the first and second openings, and junctions. The band-like portion is located longitudinally relative to the first and second conductors in a position overlapping a gap between the conductors when the metal base is viewed vertically thicknesswise from above. The junctions extend transversely relative to the metal base from the band-like portion and cause the band-like portion to conduct to the ground regions.

According to the invention, an eddy-current loss of a conductive circuit portion is reduced, and signals to be transmitted can be used at a high-frequency band, so that data can be transmitted at high speed. Further, the crosstalk characteristics are improved by the band-like portion inside the openings. Since the junctions can prevent the band-like portion from separating from the insulating layer, moreover, the peel strength of the band-like portion is high. Further, the flexure can prevent electrostatic charging of or discharge from the band-like portion. The band-like portion and junctions, along with the openings, can be formed into predetermined shapes with high yield by etching the metal base.

In an aspect of the invention, a longitudinal junction which electrically connects the band-like portion and the ladder portion may be disposed between the ladder portion and a longitudinal end portion of the band-like portion of the metal base.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive flexure according to a first embodiment of the present invention will now be described with reference to FIGS. 1 to 7.

Figure 1:
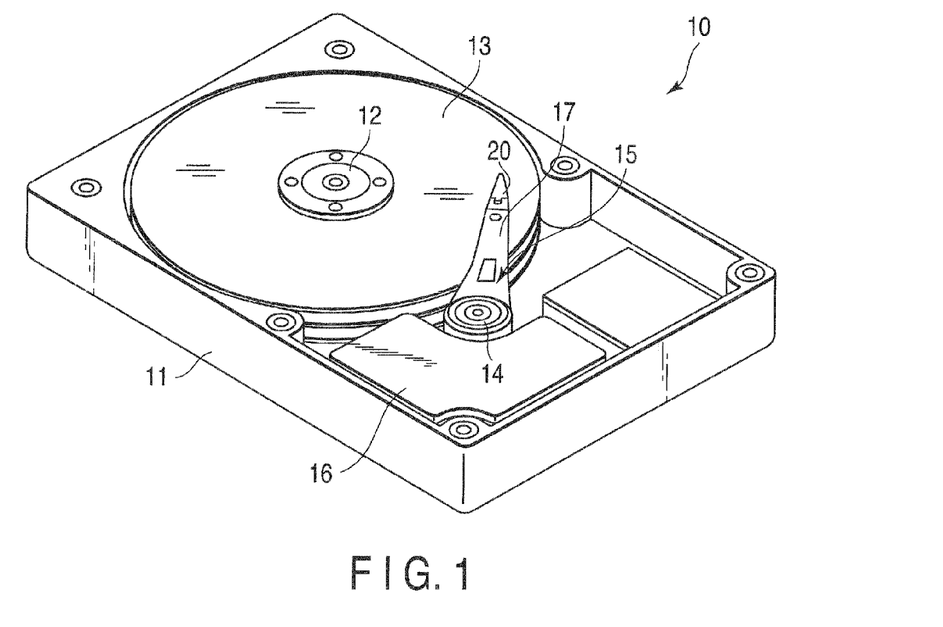
FIG. 1 is a perspective view showing an example of a disk drive with a suspension.

A hard disk drive (HDD) 10 shown in FIG. 1 comprises a case 11, disk 13, carriage 15, positioning motor 16, etc. The disk 13 rotates around a spindle 12. The carriage 15 is turnable around a pivot 14. The positioning motor 16 serves to drive the carriage 15. The case 11 is covered by a lid (not shown).

Figure 2:
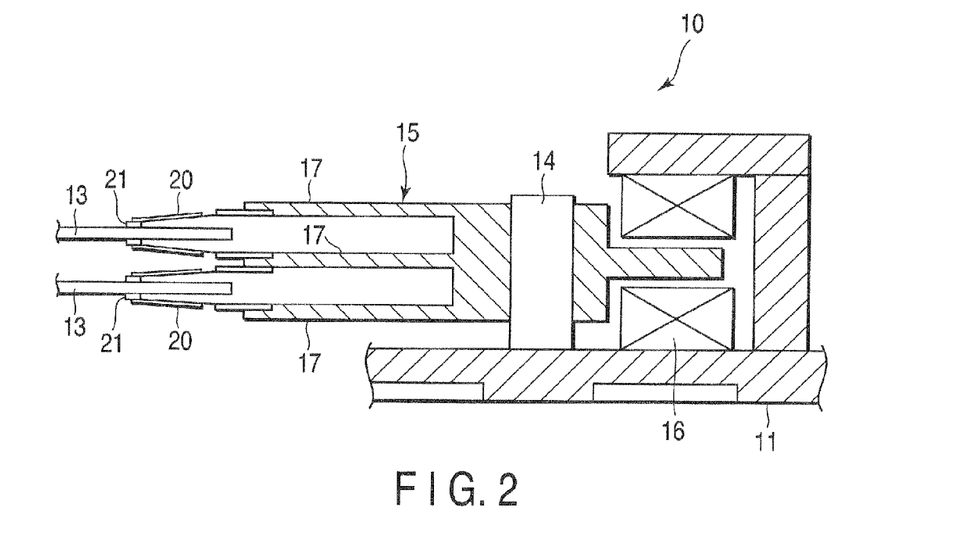
FIG. 2 is a partial sectional view of the disk drive shown in FIG. 1.

FIG. 2 is a sectional view typically showing a part of the disk drive 10. As shown in FIG. 2, arms 17 are disposed on the carriage 15. A suspension 20 is mounted on a distal end portion of each arm 17. A slider 21 constituting a magnetic head is disposed on the distal end of the suspension 20. If the disk 13 rotates at high speed, an air bearing is formed between the disk 13 and slider 21.

If the carriage 15 is turned by the positioning motor 16, the suspension 20 moves radially relative to the disk 13. Thereupon, the slider 21 moves to a desired track of the disk 13. A head portion of the slider 21 is provided with elements, such as MR elements, which can convert electrical and magnetic signals. The disk 13 can be accessed for writing or reading data by these elements.

Figure 3:
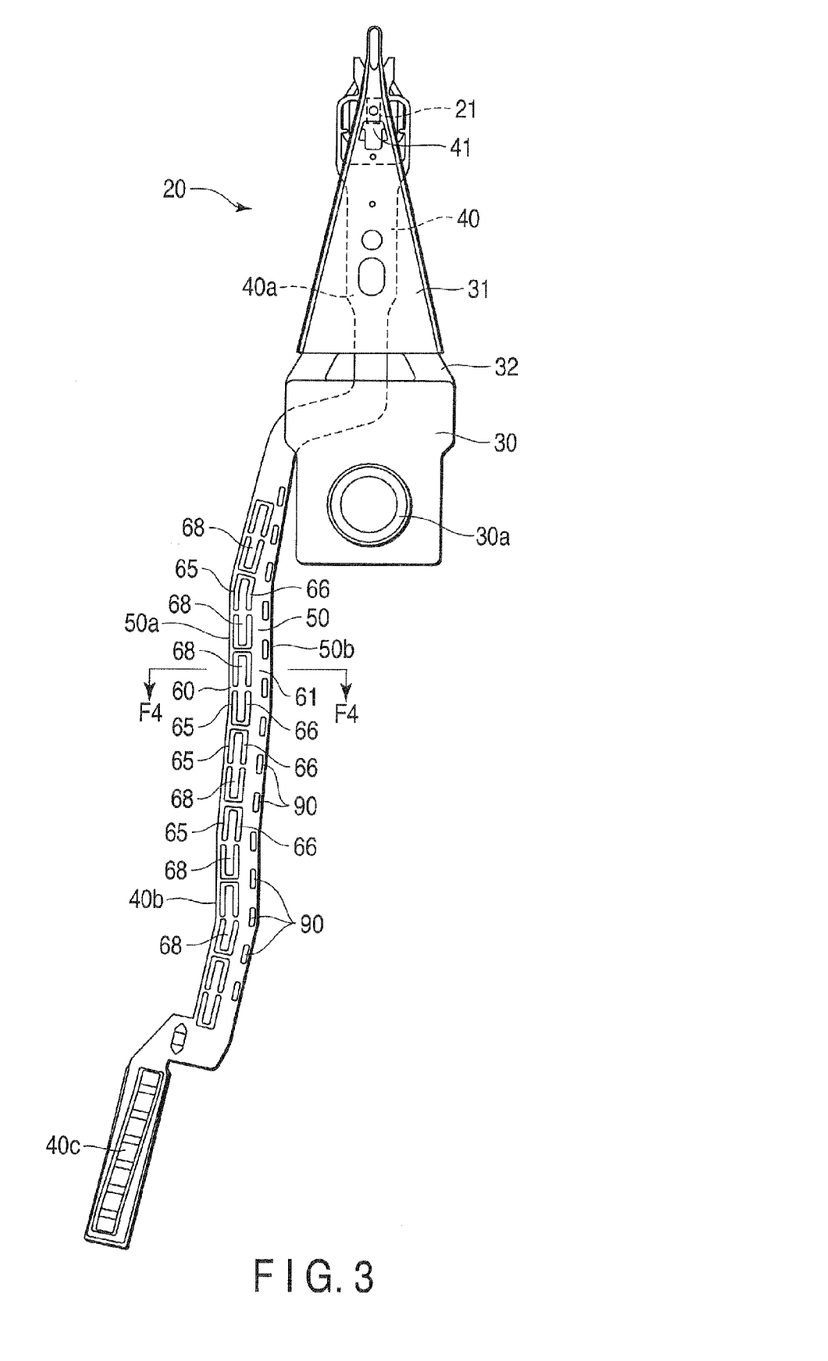
FIG. 3 is a plan view of a disk drive suspension with a flexure according to a first embodiment of the invention.

FIG. 3 shows the suspension 20 according to one embodiment of the invention. The suspension 20 comprises a baseplate 30, load beam 31, hinge member 32 formed of a thin spring plate, flexure 40 with conductors, etc. The flexure 40 with conductors will hereinafter be referred to simply as the flexure. A boss portion 30a of the baseplate 30 is fixed to the arms 17 (shown in FIGS. 1 and 2) of the carriage 15.

As shown in FIG. 3, the flexure 40 is located along the load beam 31. A portion 40a of the flexure 40 that overlaps the load beam 31 is fixed to the load beam 31 by fixing means, such as laser welding. A tongue 41 that functions as a gimbal portion is formed near the distal end of the flexure 40. The slider 21 is mounted on the tongue 41. A rear portion (tail portion) 40b of the flexure 40 extends behind the baseplate 30. A terminal area 40c of the flexure 40 is connected to an amplifier (not shown) of the disk drive 10.

Figure 4:
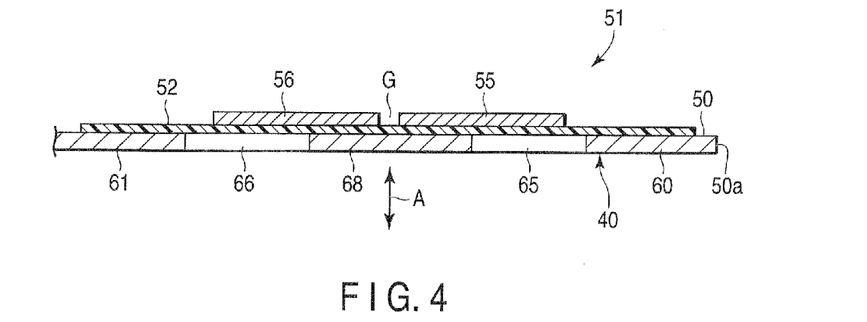
FIG. 4 is a partial cross-sectional view of the flexure taken along line F4-F4 of FIG. 3.

FIG. 4 shows a cross section of a part of the flexure 40. The flexure 40 includes a metal base 50 and conductive circuit portion 51. The metal base 50 is formed of a thin springy stainless-steel plate. The circuit portion 51 is formed along the metal base 50. The circuit portion 51 includes an insulating layer 52, first and second conductors 55 and 56, and resin cover (not shown). The conductors 55 and 56 are formed on the insulating layer 52. The resin cover covers the conductors 55 and 56. The insulating layer 52 and resin cover are formed of an electrically insulating material, such as polyimide.

The first and second conductors 55 and 56 are arranged substantially parallel to each other. The conductors 55 and 56 are formed of deposited copper. The conductors 55 and 56 are formed into a predetermined pattern along the insulating layer 52 by etching. Respective single ends of the conductors 55 and 56 are connected to the elements (not shown) of the slider 21. The other ends of the conductors 55 and 56 are connected to the amplifier through the terminal area 40c.

In FIG. 4, arrow A indicates the thickness direction of the metal base 50. Thus, the metal base 50 is planar when viewed in the direction of arrow A. The metal base 50 is thinner than the load beam 31. The thickness of the metal base 50 ranges from 15 to 20 µm, for example. The thickness of the load beam 31 ranges from 30 to 62 µm, for example. An example of the thickness of each of the conductors 55 and 56 is 10 µm. The thickness of the insulating layer 52 is 10 µm for example. The pair of conductors 55 and 56 shown in FIG. 4 are used for data writing. The flexure 40 is provided with additional conductors (e.g., a pair of conductors for data reading, not shown).

Figure 5:
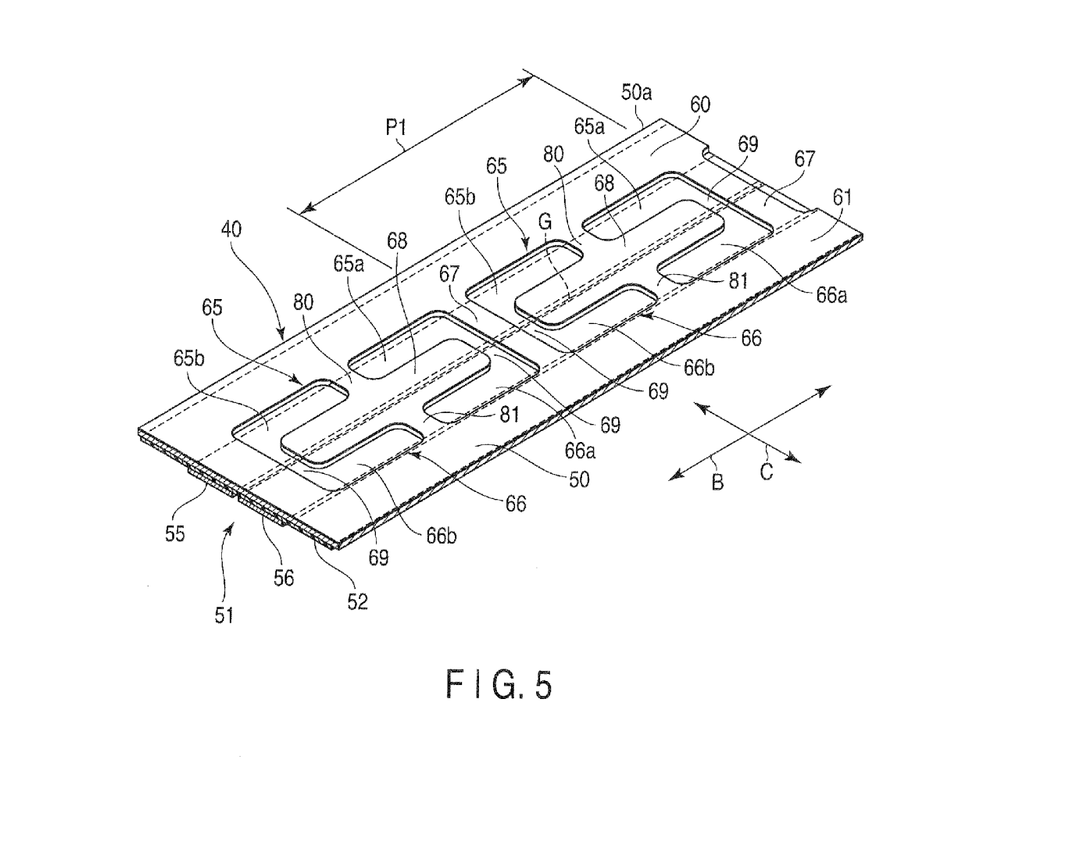
FIG. 5 is a partial perspective view of the flexure shown in FIG. 3, taken from one thicknesswise side of a metal base.
Figure 6:
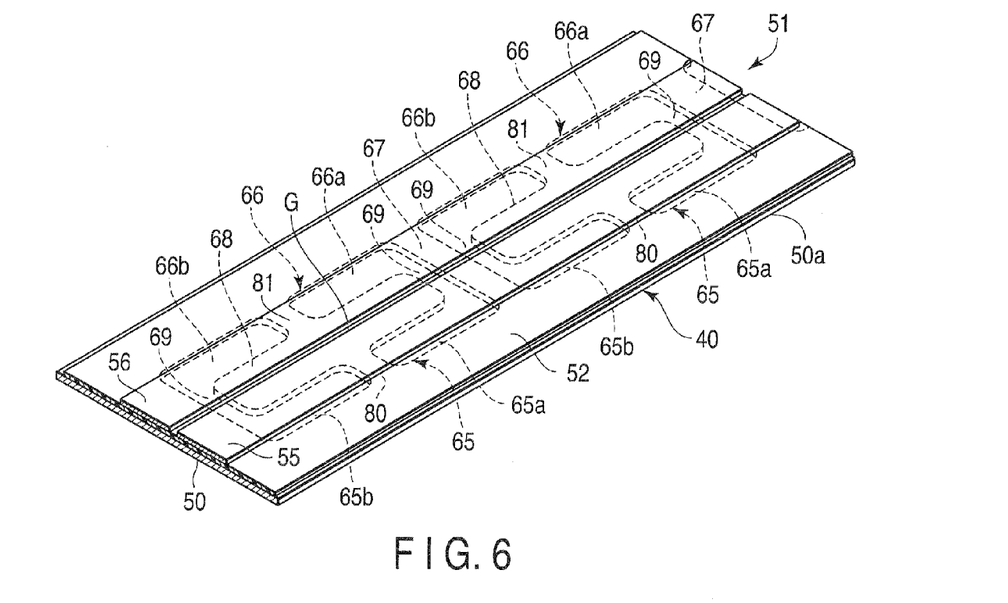
FIG. 6 is a perspective view of the flexure shown in FIG. 5, taken from the other thicknesswise side.

FIG. 5 is a partial perspective view of the flexure 40 taken from one thicknesswise side of the metal base 50. FIG. 6 is a partial perspective view of the flexure 40 taken from the other thicknesswise side. Arrows B and C in FIG. 5 indicate the longitudinal and transverse directions, respectively, of the metal base 50.

As shown in FIG. 5, the metal base 50 comprises a pair of ground regions 60 and 61, first openings 65, second openings 66, ladder portions 67, and band-like portions 68. The first openings 65 are formed at intervals longitudinally relative to the metal base 50. The second openings 66 are formed parallel to the first openings 65 and at intervals longitudinally relative to the metal base 50. The ladder portions 67 extend transversely relative to the metal base 50. The band-like portions 68 are formed between the openings 65 and 66. The pair of ground regions 60 and 61 are continuous in the longitudinal direction of the metal base 50 along opposite side edges 50a and 50b (shown in FIG. 3), respectively, of the metal base 50. The ground regions 60 and 61 are electrically grounded to the amplifier.

The first and second openings 65 and 66 extend parallel to each other. These openings 65 and 66 are formed in a plurality of pairs at predetermined intervals P1 longitudinally relative to the metal base 50. The first openings 65 are located corresponding to the first conductor 55. The openings 65 include a pair of slits 65a and 65b. The slits 65a and 65b are arranged longitudinally relative to the metal base 50. The slits 65a and 65b extend longitudinally relative to the metal base 50 along the first conductor 55.

The second openings 66 are located corresponding to the second conductor 56. The openings 66 include a pair of slits 66a and 66b. The slits 66a and 66b are arranged longitudinally relative to the metal base 50. The slits 66a and 66b extend longitudinally relative to the metal base 50 along the second conductor 56.

The slits 65a and 65b of the first openings 65 and the slits 66a and 66b of the second openings 66 communicate with one another individually through slits 69 that extend transversely relative to the metal base 50. The ladder portions 67 extend transversely relative to the metal base 50 between the ground regions 60 and 61 of the metal base 50.

The band-like portions 68 are formed between the first and second openings 65 and 66. The band-like portions 68 are located so as to overlap a gap G between the conductors 55 and 56 when the metal base 50 is viewed vertically in the thickness direction (indicated by arrow A) from above. The band-like portions 68 extend longitudinally relative to the metal base 50 along the conductors 55 and 56.

Junctions 80 and 81 are disposed between the ground regions 60 and 61 and band-like portions 68 of the metal base 50. The junctions 80 and 81 extend transversely relative to the metal base 50 from their corresponding band-like portions 68. The ground regions 60 and 61 and band-like portions 68 of the metal base 50 electrically conduct to one another through the junctions 80 and 81.

The openings 65 and 66 are formed by etching a stainless-steel plate, such as SUS304, which is the material of the metal base 50. The ground regions 60 and 61, ladder portions 67, band-like portions 68, and junctions 80 and 81 are portions that are left unetched.

As shown in FIG. 3, the flexure 40 according to the present embodiment comprises a plurality of third openings 90. The third openings 90 are formed along the side edge 50b of the metal base 50. The third openings 90 are formed longitudinally relative to the metal base 50 at predetermined intervals along the read conductors (not shown).

As described above, the metal base 50 according to the present embodiment is formed with the band-like portions 68 along the conductors 55 and 56. The band-like portions 68 extend longitudinally relative to the conductors 55 and 56 so as to face the gap G between the conductors 55 and 56. In addition, the band-like portions 68 are arranged longitudinally relative to the metal base 50 at predetermined intervals.

Figure 7:
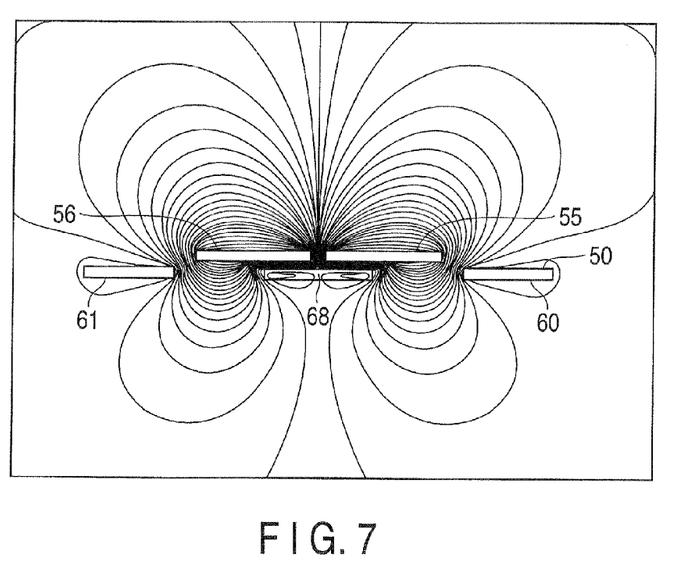
FIG. 7 is a magnetic flux diagram showing a magnetic field produced in a conductive circuit portion of the flexure shown in FIG. 3.
Figure 8:
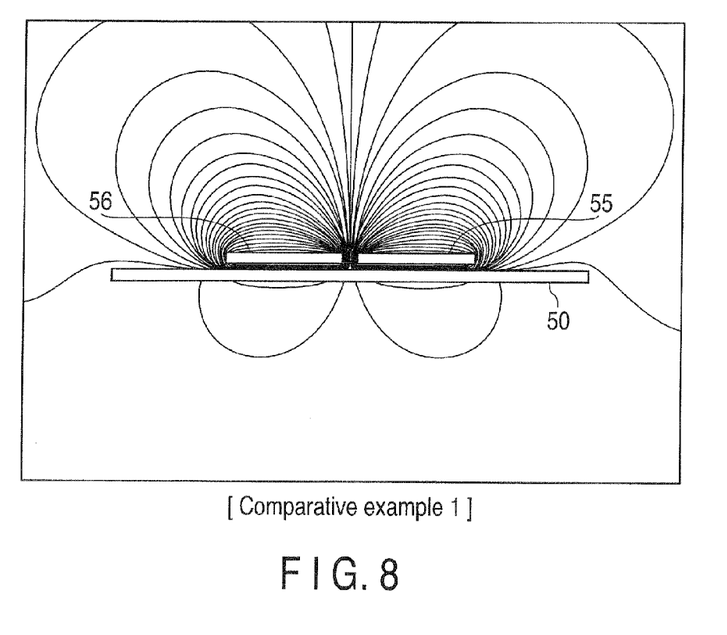
FIG. 8 is a magnetic flux diagram showing a magnetic field produced in a conductive circuit portion of a flexure of Comparative Example 1.
Figure 9:
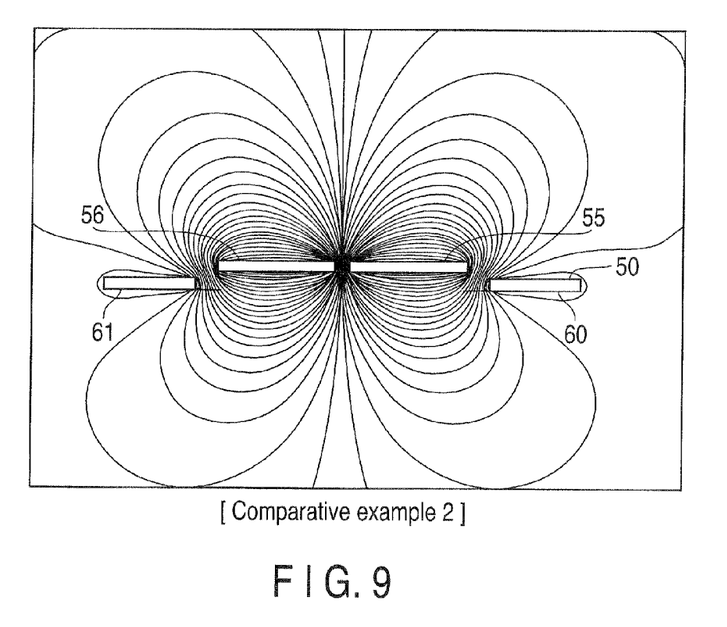
FIG. 9 is a magnetic flux diagram showing a magnetic field produced in a conductive circuit portion of a flexure of Comparative Example 2.

FIG. 7 is a magnetic flux diagram obtained when current is passed through the conductors 55 and 56 of the flexure 40 of the present embodiment. FIG. 8 is a magnetic flux diagram of a flexure in which no openings are formed in its metal base (Comparative Example 1). FIG. 9 is a magnetic flux diagram of a flexure whose metal base is formed with openings only and comprises no band-like portions (Comparative Example 2). The crosstalk characteristics of Comparative Example 2 are poorer because of leakage of magnetic flux around the conductors 55 and 56.

In the flexure 40 of the present embodiment, as shown in FIG. 7, the magnetic flux from the conductors 55 and 56 is prevented from propagating by the band-like portions 68. Thus, the flexure 40 has effects to improve the crosstalk characteristics, that is, to prevent noise. In addition, the flexure 40 of the present embodiment suffers an eddy-current loss lower than in Comparative Example 1 without openings. Accordingly, high-speed data transmission can be achieved by using a high-frequency band. In the flexure 40 of the present embodiment, moreover, the capacitance of the conductive circuit portion is higher than in Comparative Example 2 with openings only. Thus, the impedance can be lowered, so that the energy consumption of the amplifier can be reduced.

In the flexure 40 of the present embodiment, the band-like portions 68 electrically conduct to the ground regions 60 and 61 of the metal base 50 through the junctions 80 and 81. The ground regions 60 and 61 are grounded to the amplifier. Thus, electrostatic charging of the band-like portions 68 can be avoided, and problems attributable to electrostatic discharge from the band-like portions 68 can be prevented. In addition, the band-like portions 68 are connected to the ground regions 60 and 61 of the metal base 50 by the junctions 80 and 81. Accordingly, the band-like portions 68 can be prevented from separating from the insulating layer 52, so that the peel strength can be increased.

Figure 10:
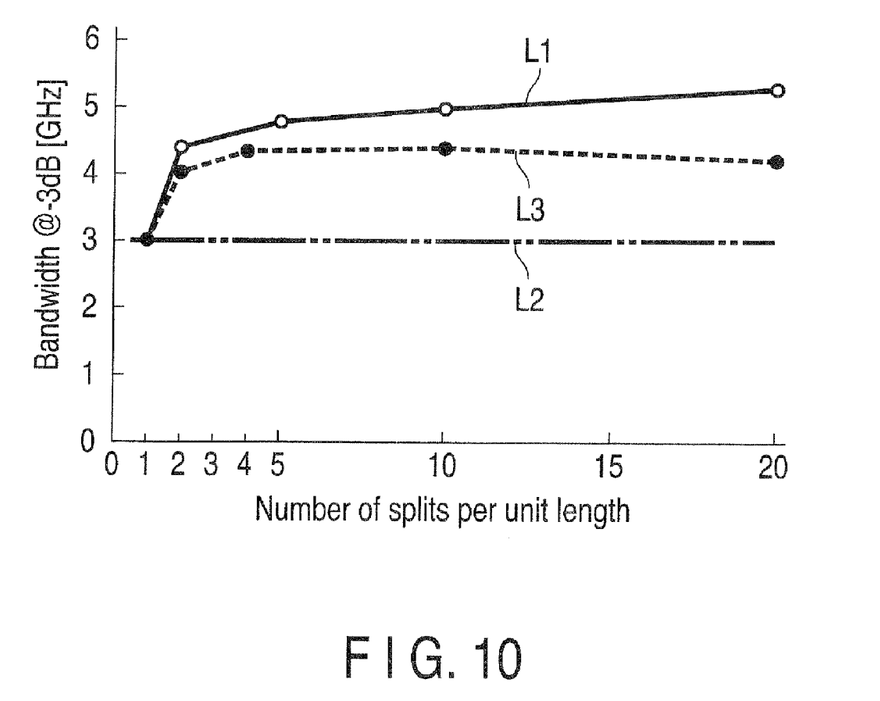
FIG. 10 is diagram showing the relationship between the bandwidth and the number of splits of openings per unit length of the metal base.

In FIG. 10, solid line L1 represents the relationship between the number of splits (or divisions) of the openings 65 and 66 per unit length of the metal base 50 of the first embodiment and a maximum bandwidth within a loss of 3 dB. The more the splits, the more the openings 65 and 66 and band-like portions 68 per unit length are, and the shorter the openings 65 and 66 and band-like portions 68 for each split are. In the case of the flexure 40 of the present embodiment, a high-frequency band (4 GHz or more) can be obtained by using two or more splits, as indicated by solid line L1. Thus, the flexure 40 is suitable for high-speed data transmission. In FIG. 10, two-dot chain line L2 represents a case where a single split is used and the bandwidth is 3 GHz.

Figure 11:
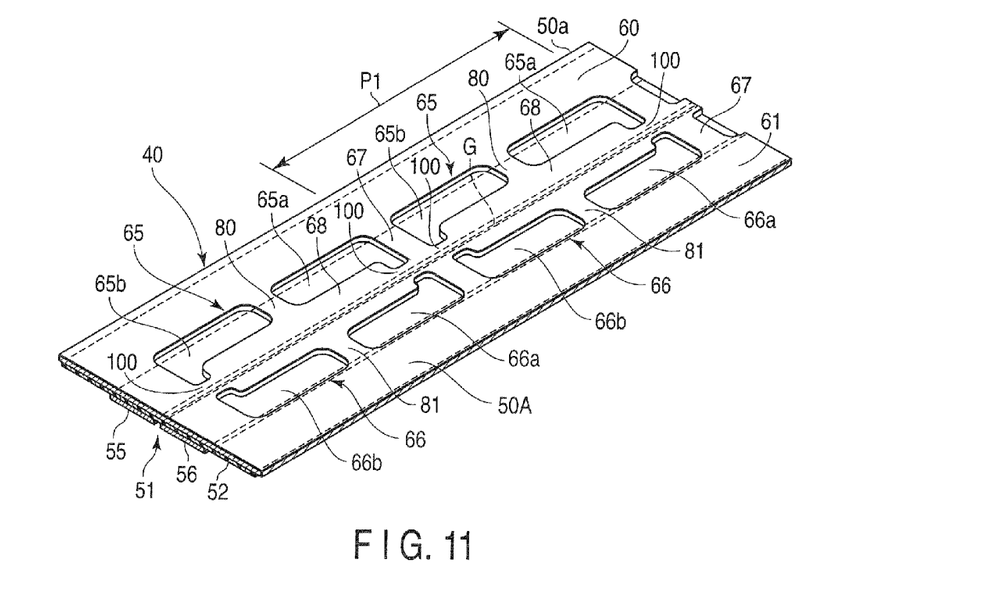
FIG. 11 is a partial perspective view of a flexure according to a second embodiment of the invention, taken from one thicknesswise side of a metal base.
Figure 12:
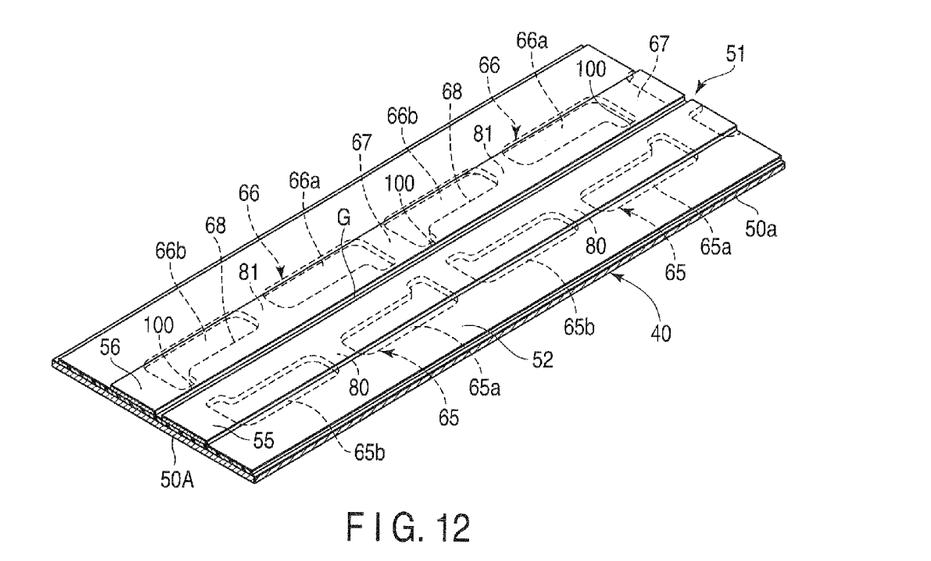
FIG. 12 is a partial perspective view of the flexure shown in FIG. 11, taken from the other thicknesswise side.

FIG. 11 is a partial perspective view of a flexure 40 comprising a metal base 50A according to a second embodiment of the invention, taken from one thicknesswise side. FIG. 12 is a partial perspective view of the flexure 40 shown in FIG. 11, taken from the other thicknesswise side. The metal base 50A comprises longitudinal junctions 100 formed individually between ladder portions 67 and respective longitudinal ends of band-like portions 68 corresponding thereto. The longitudinal junctions 100 extend longitudinally relative to the metal base 50A. The junctions 100 electrically connect the band-like portions 68 and ladder portions 67. Each longitudinal junction 100 is narrower than each band-like portion 68. Since other configurations of the flexure 40 of the second embodiment are the same as those of the first embodiment, common numbers are used to designate portions common to the two embodiments, and a description of those portions is omitted. The flexure 40 with the metal base 50A of the second embodiment can also provide the same electrical properties and peel strength as those of the first embodiment.

Figure 13:
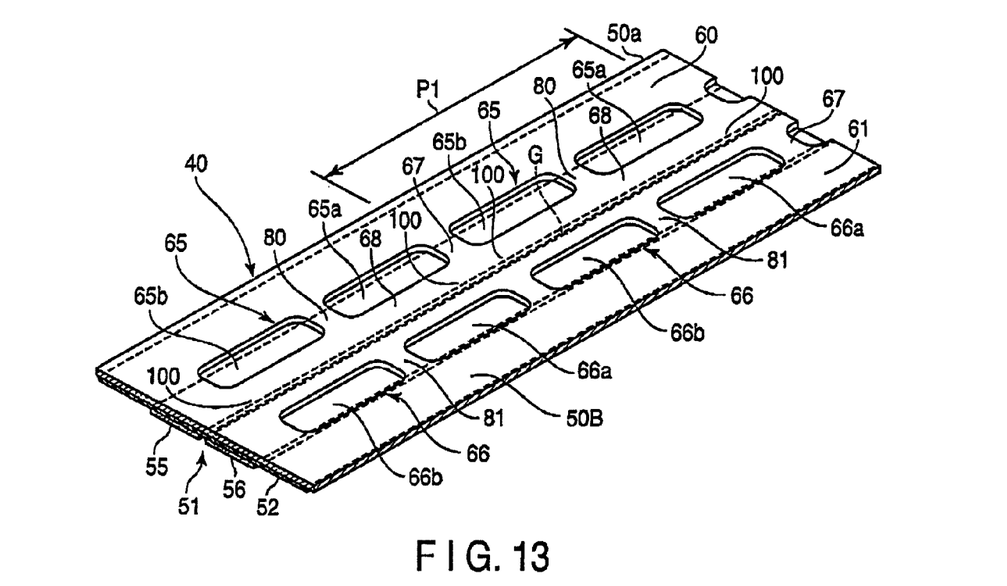
FIG. 13 is a partial perspective view of a flexure according to a third embodiment of the invention, taken from one thicknesswise side of a metal base.
Figure 14:
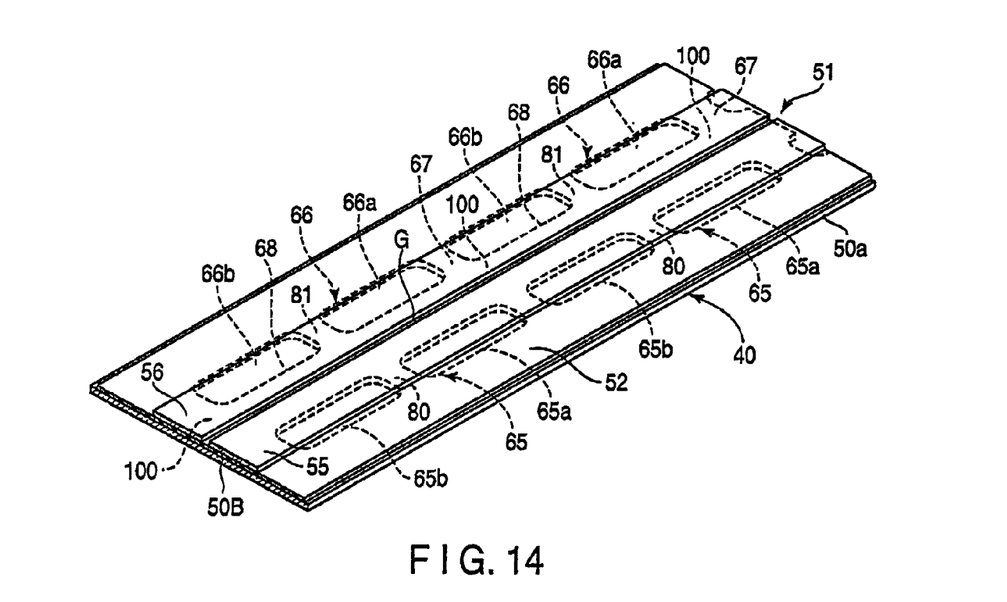
FIG. 14 is a partial perspective view of the flexure shown in FIG. 13, taken from the other thicknesswise side.

FIG. 13 is a partial perspective view of a flexure 40 comprising a metal base 50B according to a third embodiment of the invention, taken from one thicknesswise side. FIG. 14 is a partial perspective view of the flexure 40 shown in FIG. 13, taken from the other thicknesswise side. Each band-like portion 68 and each longitudinal junction 100 of the metal base 50B have equal widths. Other configurations of the flexure 40 of the third embodiment are the same as those of the second embodiment.

In FIG. 10, broken line L3 represents the relationship between the number of splits of openings 65 and 66 of the metal base 50B of the third embodiment and a maximum bandwidth within a loss of 3 dB. Also in the case of the flexure 40 with the metal base 50B of the third embodiment, a high-frequency band (4 GHz or more) can be obtained by using two or more splits, so that this flexure 40 is suitable for high-speed data transmission.

It is to be understood, in carrying out the present invention, that the constituent elements of the invention, including the first and second openings, ladder portions, band-like portions, junctions, etc., as well as the metal base, insulating layer, and conductors that constitute the flexure, may be embodied in various forms without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure which comprises a gimbal portion disposed on a load beam of a disk drive suspension and configured to be mounted with a slider which has an element for data writing, the flexure comprising:
   a plate-like metal base formed of an electrically conductive material;
   an insulating layer formed of an electrically insulating material and formed on the metal base; and
   first and second conductors for data writing formed in contact with the insulating layer and extending longitudinally relative to the metal base, the conductors being electrically connected to the element for data writing of the slider;
   wherein the metal base comprises:
      a pair of ground regions, each of which is continuous in a longitudinal direction of the metal base, provided along opposite side edges of the metal base,
      a plurality of first openings formed at predetermined intervals longitudinally relative to the metal base so as to be located corresponding to the first conductor for data writing, the first openings extending longitudinally relative to the metal base,
      a plurality of second openings formed parallel to the first openings and at the predetermined intervals so as to be located corresponding to the second conductor for data writing, the second openings extending longitudinally relative to the metal base,
      a ladder portion extending transversely relative to the metal base between the ground regions of the metal base,
      a band-like portion formed between the first and second openings and located longitudinally relative to the first and second conductors for data writing in a position overlapping a gap between the conductors for data writing when the metal base is viewed vertically in a thickness direction from above, the band-like portion extending longitudinally relative to the metal base, and
      junctions extending transversely relative to the metal base from the band-like portion and configured to cause the band-like portion to conduct to the ground regions.

2. A disk drive flexure according to claim 1, wherein a longitudinal junction which electrically connects the band-like portion and the ladder portion is disposed between the ladder portion and a longitudinal end portion of the band-like portion, the longitudinal junction being located in a position overlapping the gap between the conductors for data writing when the metal base is viewed vertically in the thickness direction from above.

* * * * *